United States Patent [19]

Bennett

[11] 4,117,876
[45] Oct. 3, 1978

[54] AWNING FOR A MOBILE HOME

[75] Inventor: J. Richard Bennett, Fullerton, Calif.

[73] Assignee: A & E Plastik Pak Co. Inc., City of Industry, Calif.

[21] Appl. No.: 798,847

[22] Filed: May 20, 1977

Related U.S. Application Data

[63] Continuation of Ser. No. 580,614, May 27, 1975, abandoned.

[51] Int. Cl.² .............................................. E04F 10/06
[52] U.S. Cl. ......................................... 160/67; 160/80; 135/5 AT
[58] Field of Search .................. 160/67, 69, 71, 72, 160/78-80, 45, 46, 22, 24; 135/5 AT, 5 A, 15 PQ; 248/273, 357

[56] References Cited

U.S. PATENT DOCUMENTS

| 3,789,903 | 2/1974 | Clark et al. ................... 135/5 AT X |
| 3,834,400 | 9/1974 | Sattler ............................... 135/5 AT |
| 3,866,874 | 2/1975 | Upton, Jr. ........................... 160/72 X |
| 3,918,510 | 11/1975 | Hayward ............................... 160/45 |

Primary Examiner—Philip C. Kannan
Attorney, Agent, or Firm—Ellsworth R. Roston

[57] ABSTRACT

An awning assembly includes a pair of collapsible arm assemblies supporting a roller having an awning disposed on the roller and extending to a wall. Each of the arm assemblies includes a telescoping main support arm having a first channel and a second channel which extends between the wall and the roller. A telescoping rafter arm extends between the wall and a slide which is movable within the first channel. The arm assemblies are collapsible from an extended position to a stored position wherein the rafter arm is disposed in the second channel, the main support arm is held next the wall, and the awning is rolled on the roller. The main support arm has a locking ear which registers with a locking ear fixed to the wall to lock the main support arm in the stored position. A mounting bracket associated with each of the main support arms can be operated to detach the main support arm from the wall. This permits the main support arm to be moved to a vertical orientation in the extended position.

30 Claims, 15 Drawing Figures

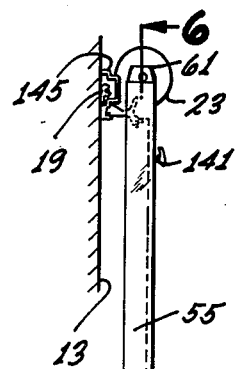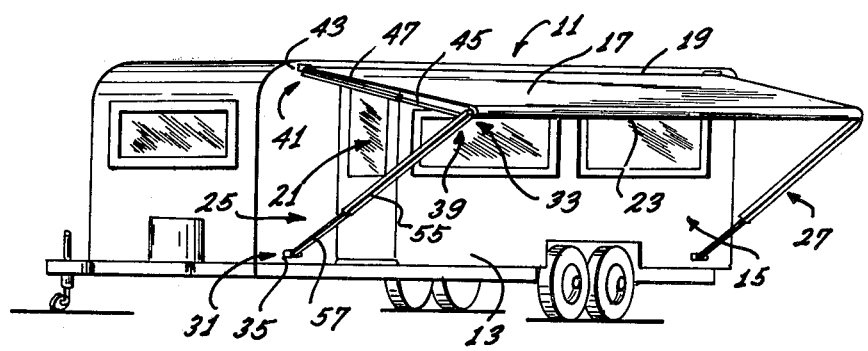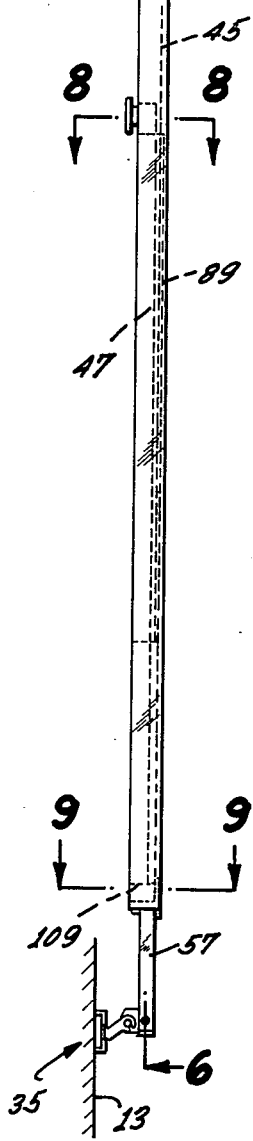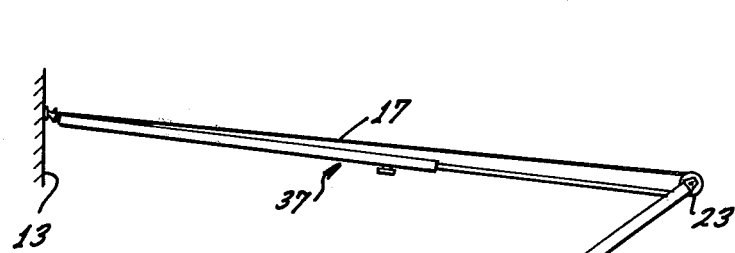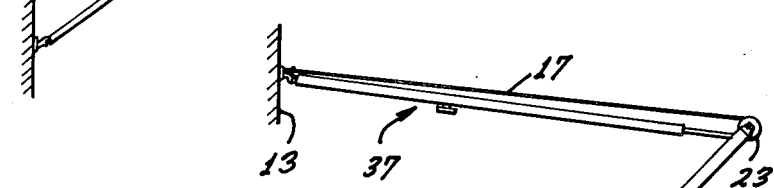

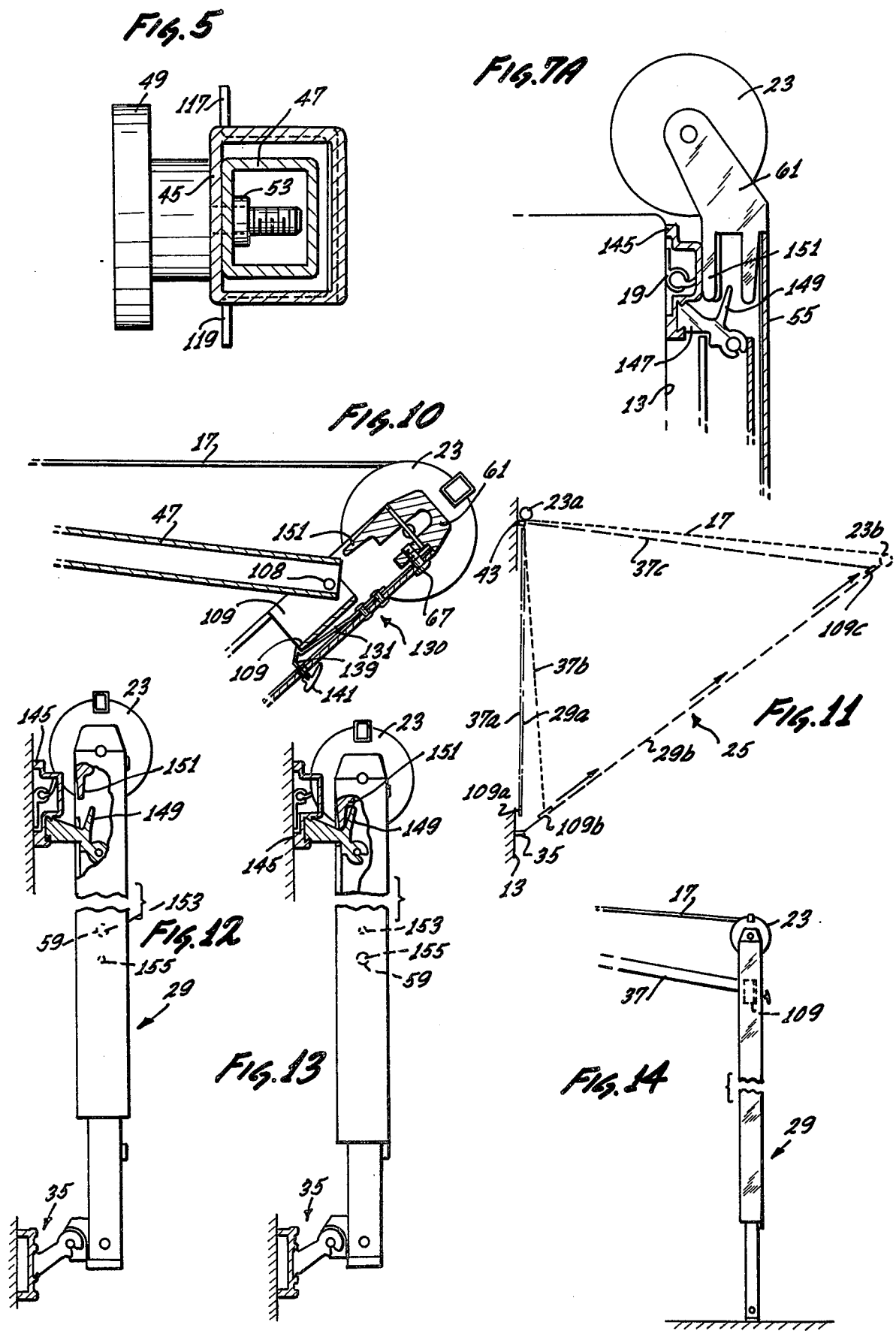

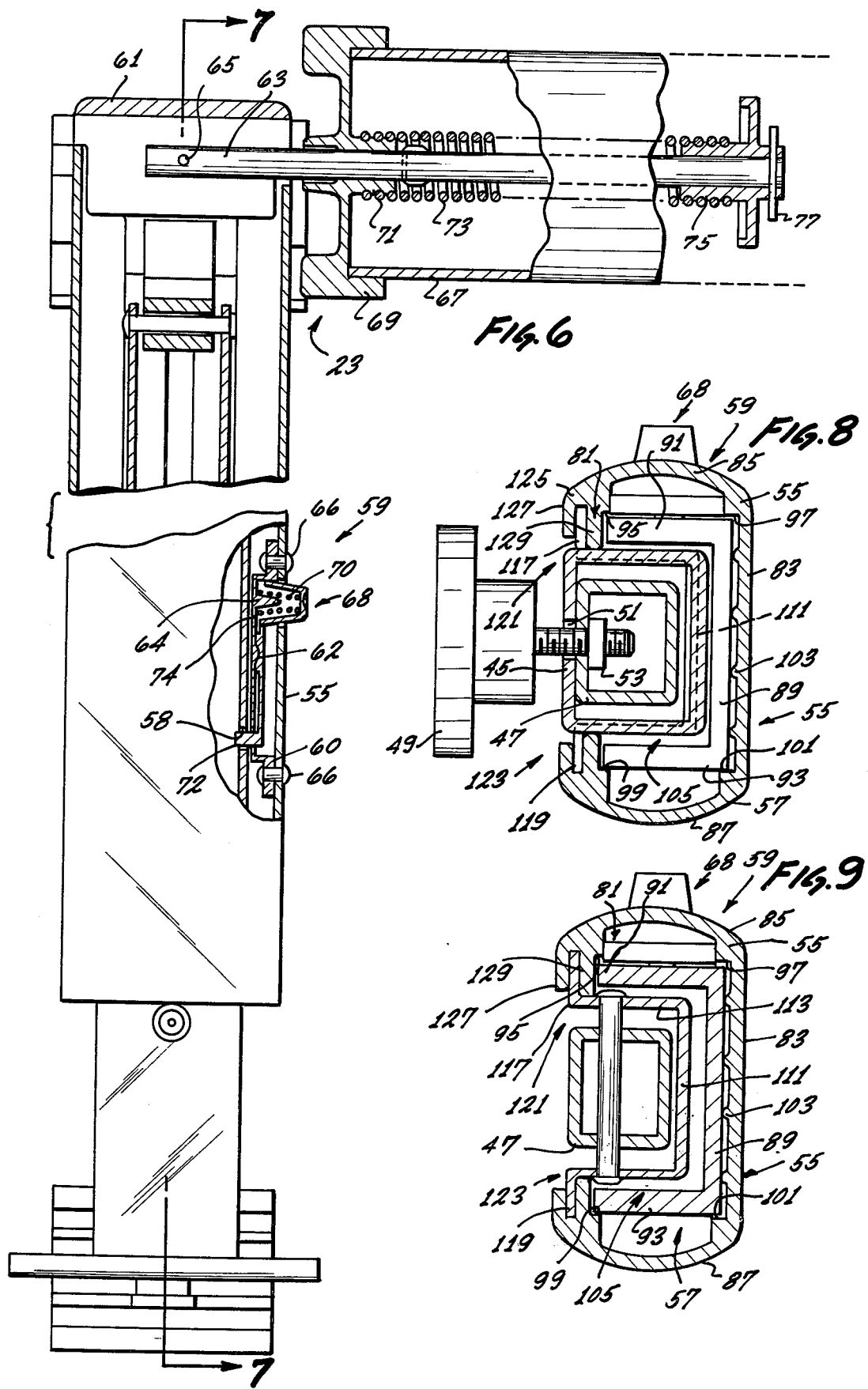

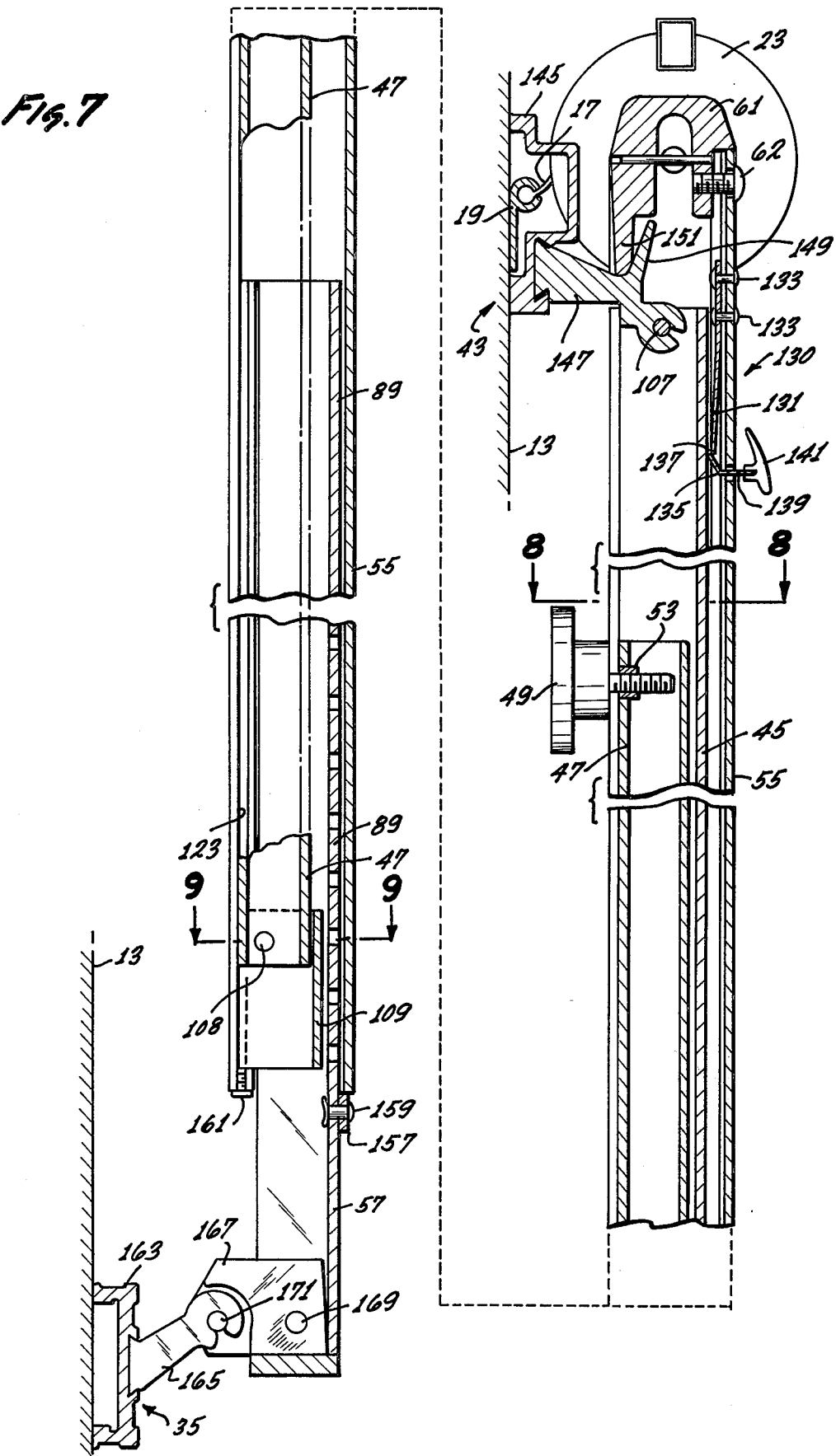

AWNING FOR A MOBILE HOME

This is a continuation of application Ser. No. 580,614 filed May 27, 1975 (now abandoned).

BACKGROUND OF THE INVENTION

1. Field of the Invention

This invention relates generally to awnings and more specifically to awnings for mobile homes.

2. Description of the Prior Art

In order to facilitate the transporting of mobile homes, their size is generally limited to conform to highway regulations. When a mobile home is parked, however, this limited size makes it desirable for people to congregate outside the home. A particularly favored area in which people can relax is a shaded area commonly provided by an awning which extends from the side of the mobile home. These awnings are preferably of the type which can be rolled up and retracted into a stored position in close proximity to the side of the mobile home.

In the past, an awning support rail has been provided to extend longitudinally along the top of the mobile home. With awnings having a common rectangular configuration, one of the long sides of the awning is attached to this awning support rail. At opposite ends of the support rail and close to the bottom of the mobile home, lower mounting members have been provided for pivotally mounting a pair of main support arms to the mobile home. At the opposite ends of the main support arms, a spring biased roller has been provided which extends substantially parallel to the awning support rail and is connected to the opposite long side of the awning.

The rollers supporting the outer edge of the awning have been spring biased to roll up the awning into a compact configuration as the main support members pivot on the lower mounting members. In this stored position, the main support members extend vertically along the side of the mobile home.

In order to maintain the main support member in the extended position of the awning, rafter arms have been provided which extend generally between the main support member and some location above the lower mounting member. In one form of awning, an upper mounting member is provided near each of the ends of the awning rail. A rafter arm having two free ends is connected to one of these upper mounting members and the associated main support arm. In the stored position, these rafter arms have been merely laid in a channel provided in the main support arm. In the first instance, it has been difficult to remove these rafter arms from the channel. Even when they have been removed, it has been difficult to align and connect the free ends of the rafter arms to the upper mounting member and main support arm. This alignment and connection of course must be performed while the person assembling the awning is holding the main support arms outwardly in order to impose the spring bias on the roller.

In another form of awning structure, rafter members have been pivotally mounted to the mobile home by upper mounting members which have been disposed near the ends of the awning rail. the opposite ends of these rafter arms have hung free of the main support members in the stored position and had to be lifted into locking relationship with the main support member in an extended position. In order to move the rafter arm into this extended position, it has been necessary to align the free end of the rafter arm and then engage the main support member. As is the case with the rafter arm having two free ends, this alignment and connection of the rafter arm is particularly difficult since the spring bias of the roller has had to be opposed as the person struggles to bring the free end of the rafter arm into position.

In other forms of retractable awnings, a tubular member has been provided to extend generally between the lower mounting member and the end of the awning rail in close proximity to the side of the mobile home. A rafter arm has had one end pivotally mounted to the outermost end of the main support arm. The other end of the rafter arm has been connected to a slide which has been movable along the tubular member from a lower position associated with the stored position of the awning to an upper location associated with the extended position of the awning. Although this form of retractable awning has solved some of the problems associated with those rafter arms having free ends, the provision of an extra tubular member along the side of the coach has been expensive, cumbersome and inconvenient.

SUMMARY OF THE INVENTION

In the awning assembly of the present invention, an awning is supported on a spring biased roller which is mounted between upper ends of a pair of main support arms. The lower ends of the main support arms are pivotally mounted to a lower mounting member near the bottom of the mobile home. Upper mounting members are provided and fixed near the ends of the awning rail.

One end of each of a pair of rafter arms is pivotally mounted to an associated one of the upper mounting members while the other end of the rafter arm engages a slide which is movable within a first channel extending along the length of the main support arm. It is of particular advantage that neither of the ends of the rafter arms are free. With a partial pivotal movement of the main support arms from the stored position toward the extended position, the slide associated with one end of the rafter arms automatically moves part way along the first channel. This makes it particularly easy to grasp the rafter arm and continue the sliding action along the first channel until the slide reaches a position near the upper end of the main support arm. A releasable lock can be provided in this position to engage the slide and thereby maintain the rafter arm in a locked relationship with the main support arm in the extended position.

As the awning is moved from the extended position to the stored position, the rafter arm can be unlocked and merely slid within the first channel toward the lower mounting member as the awning is rolled on the roller and the main support arm is pivoted against the side of the mobile home. Thus the rafter arm is automatically guided into its stored position within the second channel of the main support arm.

The main support arm may be provided with a first telescoping member having not only the first channel associated with the slide but also a second channel. A second telescoping member can be slidable within the second channel to provide means for adjusting the length of the main support arm. The rafter means can be similarly formed from telescoping members so that the length of the rafter arms can also be varied. By varying the length of the main support arms, the height of the awning can be controlled. By varying the length of the rafter arms, the outward extension of the awning can be controlled for example from a full extended position to a partially extending position commonly referred to as a rally position.

A buttom assembly, carried by one of the telescoping members of the main support arm, can engage one of several holes along the length of the other telescoping member. By operating the button assembly, the main support arm can be provided with the desired length.

This button assembly and telescoping relationship of the main support arm members are of even further advantage when the awning is moved from the extended position to the stored position. The upper mounting members can be provided with an upwardly extending lip while the upper end of the main support member can be provided with a downwardly extending lip. By means of the button assembly, the main support member can be provided with a length such that the lip associated with the main support arm extends above the lip associated with the upper mounting member. Then by merely operating the button assembly and shortening the length of the main support arm, the lips can be brought into engagement to lock the main support arm against the side of the mobile home.

Still a further feature associated with the present awning is provided by the lower mounting members which have removable safety pins. By removing these pins, the lower ends of the main support arms can be disengagd from the side of a trailer and pivoted outwardly from the trailer to a ground position wherein the main support arms extend substantially vertically from the ground. This position may be preferred when the awning is more permanently mounted in the extended position.

These and other features and advantages of the present invention will become more apparent with a description of preferred embodiments and reference to the associated drawings.

DESCRIPTION OF THE DRAWINGS

FIG. 1 is a side perspective view of a mobile home and an awning supported in an extended position by main support arms and rafter arms;

FIG. 2 is a side elevational view of the awning in a stored position;

FIG. 3 is a side elevational view of the awning in the extended position;

FIG. 4 is a side elevational view of the awning in a rally position wherein the rafter arms are shortened;

FIG. 5 is a cross-sectional view of the rafter arms illustrated in FIG. 1;

FIG. 6 is a cross-sectional view of the awning taken along lines 6—6 of FIG. 2;

FIG. 7 is a cross-sectional view of the awning taken along lines 7—7 of FIG. 6;

FIG. 7a is a side elevational view showing an additional embodiment of the awning wherein the roller is supported in offset relationship with the longitudinal dimension of the main support arm;

FIG. 8 is a cross-sectional view of the awning taken along lines 8—8 of FIG. 7;

FIG. 9 is a cross-sectional view of the awning taken along lines 9—9 of FIG. 7;

FIG. 10 is a fragmentary side elevational view of the awning illustrating the slide and lock mechanism associated with the rafter arm and main support arm;

FIG. 11 is a schematic view illustrating movement of the main support arms and rafter arms with respect to each other between the extended position and the stored position of the awning;

FIG. 12 is a fragmentary side elevational view of the awning illustrating a pair of locking lips in disengaging relationship;

FIG. 13 is a fragmentary side elevational view of the awning in the stored position with the locking lips in a locked relationship; and FIG. 14 is a side elevational view of the awning in a ground position wherein the lower end of the main support arms are disengaged from the mobile home to contact the ground.

DESCRIPTION OF PREFERRED EMBODIMENTS

A coach 11 is illustrated generally in FIG. 1 and designated by reference numeral 11. The coach 11 is merely representative of a group of transportable dwellings such as trailer and motor homes which are collectively referred to as mobile homes. The coach 11 has an exterior side surface 13 which has a generally vertical orientation with respect to the ground.

An awning assembly 15 associated with the present invention is mounted with respect to the side surface 13 of the coach 11. It will be understood, however, that this assembly 15 could be mounted with respect to other exterior surfaces such as those provided at the front or rear of the coach 11.

The awning assembly 15 includes a sheet of flexible material forming an awning 17 which (in this particular embodiment of one form of the invention) has a rectangular configuration. The rectangular configuration is perhaps the most common shape for the awning 17 although other shapes might be desirable for a particular assembly. One of the long sides of the rectangular awning 17 is fixed in a conventional manner to an awning rail 19 which extends longitudinally of the coach 11 at an elevated position along the side 13. The opposite long side of the awning 17 is supported in spaced relationship to the surface 13 by a supporting structure designated generally by the reference numeral 21.

In the illustrated form of the invention, the supporting structure 21 includes a roller 23 which is fixed to the awning 17 and supported in generally parallel relationship to the surface 13 by a forward arm assembly 25 and a rearward arm assembly 27. The arm assemblies 25 and 27 are similar to each other in a preferred form of the invention and are each disposed in a generally vertical plane with an associated one of the short sides of the rectangular awning 17.

The forward arm assembly 25 in a preferred embodiment of the invention includes a main support arm 29 which is longitudinal in configuration and has a lower end 31 and an upper end 33. A lower mounting bracket 35 which is pivotally connected to the lower end 31 of the main support arm 29, is preferably mounted to the surface 13 vertically beneath the forward end of the awning rail 19 at a relatively low position on the coach 11.

The awning assembly 15 is preferably operable to support the awning 17 in a compact configuration in close proximity to the side 13 of the coach 11 to facilitate transporting of the coach 11. This stored position of the awning assembly 15 is illustrated in FIG. 2 wherein it will be noted that the main support arm 29 has a generally parallel relationship with respect to the surface 13, and the awning 17 is rolled upon the roller 23 in close proximity to the surface 13.

When a destination has been reached and it is desirable to provide a shaded area next to the coach 11, the awning assembly 15 can be deployed from the stored position to the extended position. Thus the awning 17 can be unrolled from the roller 23 to extend in a generally planar configuration between the roller 23 and the awning rail 19. In this extended position illustrated in FIGS. 1 and 3, the main support arm 29 has a angular relationship with the surface 13 and the roller 23 has a spaced relationship with the surface 13.

In one form of the invention, the roller 23 is spring biased to roll up the awning 17 so that the main support arm 29 in the extended position has a tendency to pivot inwardly about the mounting bracket 35 toward the stored position. In order to oppose this pivotal movement, the foward arm assembly 25 includes a rafter arm 37 which extends between the surface 13 and the upper end 33 of the main support arm 29. The rafter arm 37 is longitudinal in configuration and has an outer end 39 and an inner end 41. The inner end 41 can be pivotally mounted to a top mounting barcket 43 which in the preferred embodiment is disposed near the forward end of the awning rail 19.

As best illustrated in the cross-sectional view of FIG. 5, the rafter arm 37 may include an outer telescoping member 45 which telescopes with respect to an inner telescoping member 47 to vary the length of the rafter arm 37. By varying the length of the rafter arm 37, the extension of the awning 17 with respect to the side surface 13 can be varied to any desired relationship. For example, the extension of the awning 17 can be limited, as illustrated in FIG. 4, to what is commonly referred to as a "rally position".

Once a desired length of a rafter arm 37 has been provided, it can be maintained by an adjustable knob 49 which extends through a longitudinal slot 51 in the outer telescoping member 45 to register with a steel insert 53 which is fixed to the inner telescoping member 47. By tightening the knob 49, the friction between the outer and inner telescoping members 45 and 47 respectively can be increased to inhibit the telescoping movement of the members 45 and 47.

In a preferred embodiment, the length of the main support arm 29 is also variable. Thus an outer telescoping member 55, preferably disposed at the upper end 33, can have a slidable relationship with an inner telescoping member 57. Variation of the length of the main support arm 29 generally controls the height of the awning 17 in the extended position. In a preferred embodiment, the telescoping members 45, 47 and 55, 57 of the rafter arm 37 and main support arm 29, respectively, are formed from a lightweight, high strength material such as aluminum.

Once the main support arm 29 has been provided with the desired length, the outer telescoping member 55 and the inner telescoping member 57 can be held in their desired relationship by a button assembly 59 best illustrated in FIG. 6. This button assembly 59 cooperates with a plurality of holes 58 which are aligned along the length of the inner telescoping member 57.

The button assembly 59 can include a button retainer 60 having a pivot mound 62 and a spring support 64. The button retainer 60 can be held in fixed relationship to the outer telescoping member 55 by a pair of rivets 66. A button lock 68 forms a lever having a button 70 at one end which extends through a hole in the outer telescoping member 55 and a lock pin 72 at the other end. This button lock pivots about the mound 62 so that pressure on the button 70 removes the pin 72 from the holes 58 along the inner telescoping member 57. A spring 74 can be disposed over the support 64 on the retainer 60 to bias the button 70 to the locking position.

At the top end 33 of the main support arm 29, the outer telescoping member 55 is provided with a cap 61 which can be cast from aluminum, and secured to the arm 29 by a screw 62. Together with a similar cap in the rearward arm assembly 27, the cap 61 supports a torsion bar 63 which extends through and supports the roller 23. The torsion bar 63 is maintained in fixed relationship with the cap 61 by a pin 65.

The roller 23 may take the form of a roller tube 67 having at its ends a pair of end caps 69. These end caps 69 have flange portions 71 which extend inwardly of the tube 67 to define a hole through which the bar 63 extends. These end caps 69 are not connected to the bar 63 so that the tube 67 is free to rotate with respect to the stationary bar 63. A torsion spring 73 can be disposed around the bar 63 interiorly of the tube 67. The spring 73 can be connected with one of its ends fixed to the flange member 71 of the cap 69 and the other of its ends attached to an idler 75 which is fixed to the bar 63 by a spring pin 77. When the tube 67 is rotated with respect to the bar 63, that end of the spring 73 which is connected to the end cap 69 rotates while the opposite end of the spring 73 which is fixed to the idler 75 is held stationary by the bar 63. Thus the rotating of the tube 67 with respect to the bar 63 varies the tension of the spring 73.

The end cap 69 is provided with ear portions 71 which extend axially at the perimeter of the end cap 69 in the direction of the main support arm 29. These ear portions 71 engage the top mounting bracket 43 when the main support arm 29 is in the stored position. Since the top mounting bracket 43 is fixed to the coach 11, its engagement with the ear portions 71 inhibit rotation of the roller 23 in the stored position. This ensures that the awning 17, which is rolled upon the roller 23 in the stored position, does not unroll until the main support arm 29 is moved away from the top mounting bracket 43.

Although the axis of the bar 63 associated with the roller 23 is illustrated as intersecting the center line of the main support arm 29 in FIG. 7, it will be apparent that the cap 61 can be provided with an angular configuration so that the axis of the bar 63 is disposed inwardly of the center line of the main support arm 29. This angled configuration of the cap 61 is illustrated in FIG. 7a wherein it will be noted that the outer edge of the roller 23 does not extend beyond the outer end of the main support arm 29. This disposition of the roller 23 may be particularly desirable where the width of the coach and the width of the awning assembly in the stored position might otherwise exceed that specified by highway regulations.

The main support arm 29 is of particular interest to the present invention. As best illustrated in FIG. 8, the outer telescoping member 55 is preferably U-shaped in cross-section and forms a channel 81 which extends along the length of the telescoping member 55. The channel 81 is defined generally by a main wall 83 and a pair of side walls 85 and 87 which extend in the same direction from the edges of the main wall 83. The inner telescoping member 57 is slidable within this channel 81 to vary the length of the main support arm 29.

The inner telescoping member 57 may also have a U-shape formed by a main wall 89 and a pair of side walls 91 and 93. In a preferred embodiment, the side walls 91 and 93 have a planar, generally parallel relationship to each other and are substantially perpendicular to the main wall 89. Thus the inner telescoping member 57 in cross-section has a generally rectangular configuration with one of the long sides of the rectangle removed.

Although the outer telescoping member 55 may have a similar rectangular configuration, the side walls 85 and 87 in the illustrated embodiment are provided with a gently curved configuration. This configuration provides some space laterally of the inner telescoping member 57 between the side walls 91 and 85 and the side walls 93 and 87. This space may be particularly desirable to accommodate some locking mechanism for the telescoping members 55 and 57 such as the button assembly 59.

In a preferred embodiment wherein the side walls 85 and 87 are curved, portions of the side walls 85 and 87 can form shoulders in proximity to the side walls 91 and 93 to provide guides for the inner telescoping member 57. For example, the side all 85 can be provided with shoulders 95 and 98 which face toward the side wall 91. Similarly the side wall 87 can be provided with shoulders 99 and 101 which face toward the side wall 93 of the inner telescoping member 57. In order to reduce the friction between the inner and outer telescoping members 57 and 55 respectively, the main wall 83 of the outer telescoping member 55 can be provided with ridges 103. These ridges 103 contact the main wall of the inner telescoping member 57 along substantially parallel lines.

The open sides of both of the U-shaped outer and inner members 55 and 57 respectively face in the same direction so that the inner telescoping member 57 forms a channel 105 within the channel 81 of the outer telescoping member 55. In the preferred embodiment, the rafter arm 37 in proximity to the inner member 57 moves within this channel 105. When the rafter arm 37 extends beyond the inner telescoping member 57, it moves within the channel 81. If the forward arm assembly 25 is in the extended position as illustrated in FIGS. 1 and 3, only the outer end 39 of the rafter arm 37 is disposed within the channels 81 and 105. However, when the main support arm 29 is pivoted to the stored position as illustrated in FIG. 2, the entire rafter arm 37 is disposed within the channels 105 and 81.

In one form of the invention, the outer telescoping member 45 of the rafter arm 37 is pivotally mounted to the top mounting bracket 43 by a pin or tube rivet 107. The inner telescoping member 47 of the rafter arm 37 is pivotally mounted to a slide 109 by a pin or tube rivet 108. It is the slide 109 which carries the outer end 39 of the rafter arm 37 along the channels 81 and 105.

The slide 109 has a U-shaped configuration similar to the inner telescoping member 57 with a main wall 111, and a pair of side walls 113 and 115. However, at the edges of the side walls 113 and 115 most removed from the main wall 111, the slide 109 is provided with a pair of flanges 117 and 119 respectively. These flanges 117 and 119 extend outwardly of the side walls 113 and 115 respectively in a direction substantially perpendicular to the side walls 113, 115 and substantially parallel to the main wall 111.

These flanges 117 and 119 are slidable within an associated pair of channels 121 and 123 which are formed by the outer telescoping member 55 of the main support arm 29. The channel 121 has a main wall 125 which is substantially an extension of the side wall 85. The channel 121 also has a pair of side walls 127 and 129 which extend from the main wall 125 in substantially parallel relationship to the main wall 83 of the outer telescoping member 55. Thus the channel 121 faces generally across the open end of the outer telescoping member 55 toward the side wall 87.

The channel 123 can be formed by a structure similar to that forming the channel 121 except that the channel 123 faces a direction opposite to the channel 121. In other words, the channel 123 faces across the open side of the outer telescoping member 55 in the direction of the side wall 85.

With the flanges 117 and 119 disposed in the respective channels 121 and 123, the side wall 129 forming the channel 121 is preferably of sufficient length to contact the side wall 113 of the slide 109. With the side wall 115 similarly contacted by the portions forming the channel 123, the slide 109 is guided within the channels 81 and 105 but does not contact the telescoping members 55 and 57 of the main support arm 29. A screw 161, best illustrated in FIG. 7, can be disposed in the channel 123 to ensure the slide 109 does not fall from the main support arm 29.

When the main support is in the extended position, it may be desirable to fix the outer end 39 of the rafter arm 37 in proximity to the upper end 33 of the main support arm 29. This can be accomplished by a novel lock assembly such as that designated generally by the reference numeral 130 in FIGS. 7 and 10. In a preferred form, this lock assembly 130 includes a spring member 131 which is held against the inside surface of the main wall 83 of the outer telescoping member 55 by a pair of rivets 133. This spring member 131 extends primarily in the channel 81 above the inner telescoping member 89. In this location, it is free to engage the slide 109 as it moves within the channel 81 above the channel 105 formed by the inner telescoping member 89.

The spring member 131 includes a ramp portion 135 which extends inwardly of the main wall 83 with progressive positions toward the upper end 33 of the main support arm 29. Just above the ramp portion 135, the spring member 131 forms a shoulder portion 137 which faces upwardly within the channel 81.

As the slide 109 moves upwardly within the channel 81, it contacts the ramp portions 135 to displace the locking assembly 130 outwardly and thereby permit the slide 109 to move above the locking assembly 130. However, as the slide 109 tends to move downwardly within the channel 81, it contacts the shoulder 137 which inhibits its downward movement to lock the outer end 39 of the rafter arm 37 in proximity to the upper end 33 of the main support arm 29. The spring member 131 also includes portions 139 which extend through the main wall 83 of the outer telescoping member 55 to a release lever 141. This release lever 141 can be pulled outwardly to remove the shoulder portions 137 from locking relationship with the slide 109. This will permit the slide 109 to move downwardly within the channel 81.

The operation of the awning assembly 15, which is illustrated schematically in FIG. 11, is particularly simple due to the novel construction of the arm assemblies 25 and 27. In FIG. 11, the main support arm 29 and the rafter arm 37 are represented by lines and their reference numerals are followed by progressive lower case letters which represent progressive positions of the arms 29 and 37 from the stored position to the extended position.

In the stored position both of the arms 37a and 29a have a substantially parallel relationship to the side 13 of the coach 11. As the main support arm 29a is pivoted outwardly about the lower mounting bracket 35, it moves to the extended position as shown by the line 29b as the awning 17 unrolls from the roller 23b. With this movement of the main support arm 29b, the rafter arm 37a is removed from the channel 105 to an intermediate position shown by the line 37b. With the rafter arm 37b displaced slightly from the stored position, it is easier to grasp. Furthermore, with the slide 109b disposed in the channels 123 and 125, the rafter arm 37b is already aligned for movement relative to the main support arm 29b. Thus, the slide 109b can be moved upwardly along the main support arm 29b as the rafter arm 37b pivots on the upper mounting bracket 43.

With movement of the slide 109b upwardly along the main support arm 29b, the slide 109c is ultimately engaged by the locking assembly 130. In this location the rafter arm is in the extended position shown by the line 37c. The knob 49 is loosened when the rafter arm 37 is in the stored position so that the rafter arm 37 is free to expand as it moves between the progressive positions 37a and 37c. In the extended position, the length of the rafter arm 37c and the main support arm 29b can be adjusted to vary the length and the height respectively of the awning 17. Once their lengths have been adjusted, the rafter arm 37 and the main support arm 29 can be locked by operation of the knob 49 and the button assembly 59, respectively.

It is particularly advantageous that the movement of the rafter arm 37 in the stored position to the extended position does not require any guiding motion. With the disposition of the slide 109 in a channel formed by the main support arm 29, the outer end of the rafter arm 37 is automatically guided into place. The steps of this method for moving the arm assembly 25 to the extended position can be reversed to move the assembly 25 to the stored position.

Another feature of particular advantage to the present invention is associated with means for locking the awning assembly 15 in the stored position next to the side 13 of the coach 11. With reference to FIG. 7 it will be noted that the upper mounting bracket 43 can include a channel member 145 which is adapted to fit over the awning rail 19. The bracket 43 also includes an extension 147 which is fixed to the channel member 145 and is suitably apertured to receive the rivet 107 for connection to the outer telescoping member 45 of the rafter arm 37. of particular interest to the locking of the arm assembly 25 in the stored position is a lip 149 which can be formed as part of the extension 147.

In a preferred embodiment, this lip 149 extends upwardly and slightly outwardly of the side 13 of the coach. In the stored position of the awning assembly 25, the lip 149 engages a lip 151 which can be formed as part of the cap 61 on the top of the main support arm 29. The lip 151, which is the preferred embodiment extends downwardly, is adapted for disposition between the lip 149 and the side of the coach 11 when the main support arm 29 is in the stored position. When maintained in this position, the lips 149 and 151 will inhibit the outward movement of the top of the main support arm 29 and thereby maintain the awning in the stored position.

The lips 149 and 151 cooperate with the button assembly 59 for locking and unlocking the arm assembly 25 in the stored position. As previously discussed, the button assembly 59 can maintain the telescoping members 55 and 57 of the main support arm 37 in at least two discrete positions such as those illustrated by the arrows 153 and 155 in FIG. 12. With the button assembly 59 disposed in the position 153, the main support arm 29 can be provided with a length sufficient to displace the lip 151 from the mounting bracket 35 a greater distance than that separating the lip 149 and the bracket 35. This will permit pivotal movement of the main support arm 29 about the bottom mounting bracket 35 between the stored position illustrated in FIG. 13 and the extended position shown in FIGS. 1 and 3. In this position the lip 151 is displaced above the lip 149. Then by the simple operation of the button assembly 59 from the position 153 to the position 155 shown in FIG. 13, the length of the main support arm 29 can be shortened so that the lip 151 engages the lip 149 to lock the arm assembly 25 in the stored position.

It will be apparent that in another form of the invention, the lip 151 on the main support arm 29 may extend upwardly while the lip 149 on the bracket 43 may extend downwardly. In such an embodiment, the final movement of the outer telescoping member 55 to the stored position would be an upward movement to engage the lips 149 and 151. The downward movement associated with the illustrated embodiment might be preferred since it is aided by the force of gravity.

A stop plug 157 can be fixed to the inner telescoping member 57 of the main support arm 29 by a rivet 159. This stop plug 157 can inhibit movement of the button assembly 59 beyond the position 155 so that the button assembly 59 automatically engages the hole 58 associated with that position 155.

Another feature of particular advantage to the present invention is associated with the bottom mounting bracket 35. In a preferred embodiment, this bracket includes a channel member 163 which is fixed to the side 13 of the coach 11 and an extension 165 which extends outwardly of the channel member 163. A foot hinge 167 can be fixed to the bottom most end of the inner telescoping member 57 of the main support arm 29 for example by a tube rivet 169. In a preferred embodiment, this foot hinge 167 is pivotally connected to the extension 165 by a safety pin 171.

In this embodiment, the pin 171 is removable from the extension 165 and the foot hinge 167 to disengage the lower end 31 of the main support arm 29 from the side 13 of the coach 11. By thus disengaging the foot hinge 167, the main support arm 29 in the extended position can be pivoted about the slide 109 on the end 39 of the rafter arm 37 until the main support arm 29 reaches a vertical disposition as illustrated in FIG. 13. This disposition of the awning assembly 15 may be particularly desirable if it is to remain in the extended position for a long period of time. With the main support arm 29 in the substantially vertical orientation, the lower end of the main support arm 29 contacts the ground. This disposition of the arm 29 also opens up the sides of the awning assembly 15 to facilitate access to the door of the coach 11.

Thus an awning assembly 15 is provided wherein the rafter arm 37 is automatically guides along the main support arm 29 toward the extended position. Variations in the length of the main support arm 29 and the rafter arm 37 permit variations in the length and height respectively of the awning 17. The provision of telescoping members 55, 57 which are lockable in a plurality of discrete positions by the button assembly 59 is particularly desirable for the main support arm 29. This button assembly 59 in cooperation with the locking lips 149 and 151 provide a particularly desirable means for locking the assembly 15 in the stored position. The locking assembly 130 associated with the slide 109 is also desirable since it automatically holds the rafter arm 37 in the extended position. It also permits the main support arm 29 to be disengaged from the lower mounting bracket 35 to permit the main support arm 29 to be moved to a vertical disposition.

Although the invention has been described with reference to a particular embodiment of one form of the awning assembly, it will be apparent to those skilled in the art that the invention can be otherwise embodied. For example, the outer or inner telescoping members of the rafter arms and main support arms might be reversed with respect to each other and a particular embodiment. Other forms of the locking assembly 130 and button assembly 159 may also be desirable for a particular form of the invention. For these reasons, the scope of the invention should be determined only with reference to the following claims.

I claim:

1. An awning assembly adapted to extend from a wall and comprising:
    shelter means forming an awning;
    main support means having a longitudinal configuration defined by a first end and a second end, the main support means including portions defining a channel extending longitudinally of the main support means;
    first bracket means for pivotally attaching the first end of the main support means to the wall; rafter means having a longitudinal configuration defined by a first end and a second end;
    second bracket means disposed on the wall for pivotally attaching the first end of the rafter means to the wall;
    slide means coupled to the rafter means and slidable in the channel of the main support means for guiding the second end of the rafter means along the main support means toward the second end of the main support means during the operation of the awning from a contracted relationship to an extended relationship;
    first locking means disposed on the wall for holding the main support means and the rafter means in a fixed relationship against the wall in the contracted relationship; and
    second locking means disposed on the main support means and cooperative with the slide means for holding the main support means and the rafter means in a fixed relationship at the second end of the main support means in the extended relationships of the awning upon the operation of the awning from the contracted relationship to the extended relationship;
    the second locking means being actuatable by the slide means to provide for a movement of the slide means in the channel of the main support means past the second locking means in the direction toward the second end of the main support means and thereafter to prevent the movement of the slide means in the channel toward the first end of the main support means, the second locking means extending outwardly from the main support means to an external position for manual actuation and being manually actuatable at the external position to provide for a movement of the slide means in the channel of the main support means past the second locking means toward the first end of the main support means.

2. The awning assembly recited in claim 1 wherein the main support means comprises:
    a first telescoping member longitudinal in configuration and defining a channel; and
    a second telescoping member longitudinal in configuration and slidable within the channel of the first telescoping member to vary the longitudinal dimension of the main support means.

3. The awning assembly recited in claim 1 wherein the rafter means comprises:
    a first telescoping member;
    a second telescoping member slidable within the first telescoping member to adjust the length of the rafter means; and
    means mountable on one of the first and second telescoping members for engaging the other of the first and second telescoping members to maintain the rafter means at a particular length in accordance with the adjustments in the length of the rafter means.

4. An awning assembly for supporting an awning on a wall in an extended position and a stored position, comprising:
    at least one main support arm longitudinal in configuration and having a first end and a second end;
    first means for removably mounting the first end of the main support arm to the wall;
    at least one rafter arm longitudinal in configuration and having a first end and a second end;
    second means for pivotally mounting the first end of the rafter arm to the wall;
    third means pivotally connected to the second end of the rafter arm for slidingly engaging the main support arm to provide for slidable movement of the rafter arm between the first end and the second end of the main support arm;
    fourth means mounted on the main support arm for providing for a slidable movement of the third means on the main support arm past the fourth means toward the second end of the main support arm and for positively engaging the third means in either the extended position or an intermediate position between the contracted and extended positions of the awning, upon movement of the third means on the main support arm past the fourth means toward the second end of the main support arm, to maintain the rafter arm in fixed relationship to the main support arm; and
    fifth means disposed externally of the main support arm and operatively coupled to the fourth means for providing an actuation of the fourth means to release the slide for movement on the main support arm past the fourth means toward the first end of the main support arm and to provide for a storing of the awning.

5. The awning assembly recited in claim 4 wherein the first means includes means operable to release the first end of the main support arm from the wall to provide for pivotal movement of the main support arm about the third means to a substantially vertical position wherein the first end of the main support arm is disposed in spacial relationship to the wall.

6. The awning assembly recited in claim 4 wherein:
the second means includes means forming a first lip extending from the wall; and
the main support arm includes means disposed at the second end of the main support arm and forming a second lip moveable into engaging relationship with the first lip of the second means to maintain the main support arm in the stored position,
a particular one of the first and second lips extending upwardly and the other one of the first and second lips extending downwardly to provide a locking relationship with the particular one of the lips.

7. The awning assembly recited in claim 6 wherein the first and second lips are constructed to provide for a release of the main support arm from the second means by moving the support arm substantially vertically in the stored position of the awning for a sufficient distance to clear the second lip from the first lip and by subsequently moving the support arm downwardly.

8. A supporting structure for an awning, the structure being mounted on a wall and being operably movable between an extended position wherein the awning is supported in extended relationship with the wall and a stored position wherein the awning is held in close proximity to the wall, the supporting structure including:
a first support member having a longitudinal configuration;
a second support member having a longitudinal configuration and a telescoping relationship with the first support member, the second support member forming with the first support member main support means extendible in a first direction to the extended position of the awning;
first mounting means affixed to the wall and having portions defining first detent means extending generally in the first direction;
second support means having a longitudinal configuration and having first and second ends and operatively coupled to the first support means at a second end for movement at the second end along the first support means;
second mounting means affixed to the wall and pivotally supporting the second support means at the first end of the second support means;
means disposed on the first support member and defining second detent means extending in a second direction generally opposite to the first direction of the first detent means for releasably engaging the first detent means in the stored position of the awning:
lock means disposed between the first support member and the second support member and having properties for locking the first and second support members in at least first and second discrete relative positions;
the second support means comprising rafter means longitudinal in configuration and having a first end pivotally mounted to the second mounting means and a second end slidable along the first support means in accordance with the disposition of the awning in the stored and extended positions;
slide means pivotally mounted to the rafter means and slidable in the channel of the first support means extending into the channel and providing a stop for the slide means to limit the movement of the slide means in the channel.

9. The supporting structure recited in claim 8 wherein the first and second detent means constitute lips having substantially a vertical disposition and the first and second lips are constructed to engage each other for retaining the first and second support means in a fixed relationship against the wall in the stored position of the awning.

10. The supporting structure recited in claim 8 wherein means are provided for locking the first and second support means in the extended position of the awning.

11. The supporting structure recited in claim 8 wherein
means are disposed on the first support member and are constructed to provide for a movement of the slide means in the channel on the first support member toward the detent means and to inhibit the movement of the slide means in the opposite direction in the channel after the movement of the slide means to the detent means on the first support member.

12. The supporting structure recited in claim 8 further comprising:
means extending from the first support member and defining a second channel and means extending from the slide means and defining a flange for disposition in the second channel.

13. The supporting structure set forth in claim 8 wherein:
the lock means in the first discrete relative position provides the main support means with a length to provide a clearance between the first and second detent means for a movement of the awning between the stored and extended positions and the lock means in the second discrete relative position provides the main support means with a length to obtain an engagement between the first and second detent means.

14. The supporting structure recited in claim 13 wherein the lock means includes:
means defining a plurality of holes spaced along one of the first support members and the second support member; and
detent means mounted on the other of the first and second support members, the detent means being biased toward the holes to extend into the holes to lock the first and second support members in at least the first and second discrete relative positions.

15. A supporting structure for an awning, the structure being mountable on a wall and being operably movable between an extended position wherein the awning is supported in extended relationship with the wall and a stored position wherein the awning is held in close proximity to the wall, the supporting structure including:
a flexible sheet member forming the awning;
first means disposed on the wall for mounting the awning to the wall;
roller means for rolling the awning to provide the awning in the stored position with a compact configuration and for unrolling the awning to provide the awning in the extended position with a substantially planar coonfiguration;
main support means longitudinal in configuration and having a first end and a second end and providing a main support to the awning in the extended position of the awning, the main support means being provided with detent means at its first end;

second means for mounting the roller means to the first end of the main support means, the roller means being rotatable with respect to the second means to provide for the rolling and unrolling of the awning on the roller means;

mounting means disposed on the wall for pivotally mounting for second end of the main support means to the wall, the main support means defining with the wall an angle which is greater in the extended position than in the stored position;

rafter means for providing an auxiliary support to the awning in the extended position of the awning;

third means mounted on the wall for engaging the detent means on the main support means and the roller means in the stored position to inhibit the unrolling of the awning in the stored position and for pivotally supporting the rafter means to provide for a pivotal movement of the rafter means in accordance with the movement of the awning between the stored and extended positions; and slide means mounted on the rafter means and retained by the main support means for slidable movement along the main support means to provide for a movement of the roller means between the stored and extended positions;

the detent means being constructed to provide a stop for the movement of the slide means along the main support means to the extended position of the roller means.

16. The supporting structure recited in claim 15 further comprising:

means for biasing the roller means and the main support means towards a position corresponding to the stored position of the awning;

the rafter means being longitudinal in configuration and having a first end and a second end;

the third means including rafter mounting means for pivotally mounting the first end of the rafter means to the wall; and fourth means operatively coupled to the second end of the rafter means in at least the extended position of the awning to oppose the bias of the biasing means and thereby maintain the main support means and the awning in the extended position.

17. The supporting structure set forth in claim 16 wherein:

the length of the main support is adjustable to vary the height of the awning in the extended position of the awning;

the length of the rafter means is adjustable to vary the length of the awning in the extended position of the awning; and the main support means is provided with a second channel and the slide means includes flanges engaging the second channel during the sliding movement of the slide means along the second channel.

18. The supporting structure set forth in claim 16 wherein:

the main support means defines a channel extending longitudinally of the main support means; and the slide means pivotally engages the second end of the rafter means and is slidable within the channel of the main support means during the movement of the main support means and the rafter means between positions corresponding to the stored position of the awning and the extended position of the awning.

19. The supporting structure set forth in claim 18 wherein means are provided on the main support means for releasably engaging the slide means of the fourth means in the extended position of the awning to retain the main support means and the rafter means in the positions for maintaining the awning in the extended position and wherein means are also provided on the main support means at a position external to the main support means for providing for an actuation of the releasably engaging means to release the slide means for movement along the main support means to the stored position of the awning means.

20. The supporting structure set forth in claim 19 wherein means are provided on the main support means for releasing the releasably engaging means on the main support means to provide for a movement of the pivotably engaging means to a position corresponding to the stored position of the awning.

21. An awning assembly adapted to extend from a wall and comprising:

an awning;

awning support means extending from the wall for supporting the awning in extended relationship to the wall;

main support means included in the awning support means and having a longitudinal configuration defined by a first end and a second end, the main support means including portions defining a channel extending longitudinally of the main support means;

first bracket means for pivotally attaching the first end of the main support means to the wall;

rafter means included in the awning support means in engageable relationship with the main support means, the rafter means having a longitudinal configuration defined by a first end and a second end;

second bracket means for pivotally attaching the first end of the rafter support means to the wall;

guide means connected to the second end of the rafter means and slidable in the channel of the main support means for guiding the second end of the rafter means along the main support means toward the second end of the main support means; whereby pivotal movement of the main support means about the first bracket means causes the rafter means to pivot about the second bracket means as the second end of the rafter means approaches the second end of the main support means;

the channel in the main support means being defined by a main wall, a first sidewall extending along one end of the main wall, and a second sidewall extending along the opposite end of the main wall, extensions being provided from the main support means to define second channels, the guide means including a pair of flanges extending in opposite directions and disposed in the second channel of the main support means to guide the movement of the rafter means along the main support means during the movement of the awning between the contracted and extended relationships.

22. An awning assembly as set forth in claim 21, including, the awning being movable between an extended relationship and a contracted relationship;

first locking means disposed on the wall for holding the main support means and the rafter means in a fixed relationship against the wall in the contracted relationship of the awning; and second locking means disposed on the main support means and cooperative with the guide means for providing for a slidable movement of the guide means, in the extended and stored positions of the awning means, toward the second end of the main support means and for holding the main support means and the rafter means in a fixed relationship at the second end of the main support means in the extended relationship of the awning or an intermediate relationship between the contracted and extended relationship of the awning and for providing for a controlled release of the rafter means from the second end of the main support means in the extended and intermediate positions of the awning means to obtain a movement of the slide means toward the first end of the main support means.

23. The awning assembly recited in claim 22, further comprising:

the second locking means including holding means disposed on the main support means in proximity to the second end of the main support means and extending into the channel in the main support means for engaging the slide means as the second end of the rafter means is moved toward the second end of the main support means; and release means disposed on the main support means and operative to remove the holding means from the channel in the main support means to provide for the displacement of the second end of the rafter means from the second end of the main support means toward the first end of the main support means.

24. An awning assembly for supporting an awning on a wall in an extended position and a stored position, comprising:

a main support arm longitudinal in configuration and having a first end and a second end;

first means for removably mounting the first end of the main support arm to the wall;

a rafter arm longitudinal in configuration and having a first end and a second end;

second means for pivotally mounting the first end of the rafter arm to the wall;

third means pivotally connected to the second end of the rafter arm for slidingly engaging the main support arm between the first end and the second end of the main support arm;

fourth means mounted on the main support arm for positively engaging the third means at the second end of the main support arm to maintain the second end of the rafter arm in close proximity to the second end of the main support arm;

the main support arm defining a channel and the third means being slidable within the channel to guide the second end of the rafter arm into the extended position of the awning;

the fourth means comprising:

a spring mounted on the main support arm and having ramp portions defining a ramp biased to extend into the channel in the main support arm with progressive positions from the first end to the second end of the main support arm to provide for movement of the third means toward the second end of the main support arm, the spring having shoulder portions defining a shoulder biased to extend into the channel to inhibit movement of the third means from the second end of the main support arm to the first end of the main support arm; and means supported by the main support arm for removing the shoulder portions of the spring from the channel to provide for movement of the third means from the second end of the main support arm toward the first end of the main support arm.

25. An awning assembly adapted to extend from a wall and comprising:

shelter means forming an awning;

main support means having a longitudinal configuration defined by a first end and a second end, the main support means defining a channel extending longitudinally of the main support means;

first bracket means for pivotally attaching the first end of the main support means to the wall;

rafter means having a longitudinal configuration defined by a first end and a second end;

second bracket means disposed on the wall for pivotally attaching the first end of the rafter means to the wall;

slide means coupled to the rafter means and slidable in the channel of the main support means for guiding the second end of the rafter means along the main support means toward the second end of the main support means;

first locking means disposed on the main support means and cooperative with the slide means for holding the main support means and the rafter means in a fixed relationship at the second end of the main support means;

first detent means included in the first bracket means;

second detent means included on the main support means and cooperative with the first detent means in retaining the main support means against the wall in the contracted relationship of the awning;

the first and second detent means being constructed to provide for a locking relationship upon a lifting of the main support means to a position providing a clearance between the first and second detent means and then a lowering of the main support means to a position providing an engagement between the first and second detent means; and means operatively coupled to the main support means for providing for a controlled adjustments in the length of the main support means in the contracted position of the awning to provide for the lifting of the main support means to a position providing a disengagement between the first and second detent means and the subsequent lowering of the main support means to a position providing a locking relationship between the first and second detent means or a position providing for an extension of the awning.

26. The awning assembly set forth in claim 25 wherein a particular one of the first and second detent means is provided with an upwardly disposed lip and the other one of the first and second detent means is provided with a downwardly disposed lip for engaging the upwardly disposed lip when the main support means is first raised to a position providing a clearance between the lips and is then lowered to a position wherein the first and second lips engage each other.

27. The awning assembly set forth in claim 25 wherein the means providing controlled adjustments in the length of the main support means include first detent means on the main support means, the first detent means on the rafter means and the second detent means on the main support means cooperating to hold the main support means in a first position providing a clearance between the upwardly disposed lip and the downwardly disposed lip or in a second position providing a locking relationship between the upwardly disposed and the downwardly extending lip.

28. An awning assembbly for supporting an awning on a wall in an extended position and a stored position, comprising:
   at least one main support arm longitudinal in configuration and having a first end and a second end;
   first means for removably mounting the first end of the main support arm to the wall;
   at least one rafter arm longitudinal in configuration and having a first end and a second end;
   second means for pivotally mounting the first end of the rafter arm to the wall;
   third means pivotally connected to the second end of the rafter arm for slidingly engaging the main support arm to provide for slidable movement of the rafter arm between the first end and the second end of the main support arm;
   fourth means mounted on the main support arm for positively engaging the third means at the second end of the main support arm, upon the movement of the awning to the extended position, to maintain the rafter arm in fixed relationship to the main support arm;
   fifth means disposed externally of the main support arm and operatively coupled to the main support arm for providing an actuation of the fourth means to release the slide for movement toward the first end of the main support arm and to provide for a storing of the awning,
   the main support arm defining a channel and the third means being slidable within the channel to guide the second end of the rafter arm into the extended position of the awning and the main support arm being constructed to define a second channel and the third means being constructed to mate with the second channel during the sliding movement of the third means along the main support arm.

29. The awning assembly recited in claim 28 wherein the fourth means comprises:
   a spring mounted on the main support arm and having ramp portions defining a ramp biased to extend into the channel in the main support arm with progressive positions from the first end to the second end of the main support arm to provide for movement of the third means toward the second end of the main support arm, the spring having shoulder portions defining a shoulder biased to extend into the channel to inhibit movement of the third means from the second end of the main support arm to the first end of the main support arm; and
   the fifth means include means supported by the main support arm at a position external to the main support arm for providing, when actuated, for a removal of the shoulder portions of the spring from the channel to provide for movement of the third means from the second end of the main support arm toward the first end of the main support arm.

30. The awning assembly recited in claim 28 wherein the main support arm includes:
   a first telescoping member defining a first channel;
   a second telescoping member slidable in the channel of the first telescoping member to vary the length of the main support arm;
   the third means slidable in the channel of the first telescoping member between the first end and the second end of the main support arm.

* * * * *